US010635082B2

(12) United States Patent
Watanabe et al.

(10) Patent No.: US 10,635,082 B2
(45) Date of Patent: Apr. 28, 2020

(54) ROBOT MOTION PROGRAM GENERATING METHOD AND ROBOT MOTION PROGRAM GENERATING APPARATUS

(71) Applicant: KAWASAKI JUKOGYO KABUSHIKI KAISHA, Kobe-shi, Hyogo (JP)

(72) Inventors: Masayuki Watanabe, Kobe (JP); Takayuki Yoshimura, Kakogawa (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 266 days.

(21) Appl. No.: 15/532,688

(22) PCT Filed: Dec. 26, 2014

(86) PCT No.: PCT/JP2014/006511
§ 371 (c)(1),
(2) Date: Jun. 2, 2017

(87) PCT Pub. No.: WO2016/103307
PCT Pub. Date: Jun. 30, 2016

(65) Prior Publication Data
US 2017/0336776 A1    Nov. 23, 2017

(51) Int. Cl.
*G05B 19/409*    (2006.01)
*G05B 19/425*    (2006.01)
*B25J 9/16*    (2006.01)

(52) U.S. Cl.
CPC ............ *G05B 19/409* (2013.01); *B25J 9/161* (2013.01); *B25J 9/1664* (2013.01); *B25J 9/1682* (2013.01);
(Continued)

(58) Field of Classification Search
CPC ................ G05B 19/409; G05B 19/425; G05B 2219/40395; G05B 2219/40392;
(Continued)

(56) References Cited

U.S. PATENT DOCUMENTS 7,676,292 B2    3/2010  Weatherhead et al.
2006/0178778 A1*  8/2006  Fuhlbrigge ............ B25J 9/1656
                                                                    700/264
(Continued)

FOREIGN PATENT DOCUMENTS

EP    0515699 A1    12/1992
EP    2396148 B1     4/2013
(Continued)

OTHER PUBLICATIONS

Mar. 31, 2015 International Search Report issued in Patent Application No. PCT/JP2014/006511.
(Continued)

*Primary Examiner* — Adam R Mott
(74) *Attorney, Agent, or Firm* — Oliff PLC

(57) ABSTRACT

The purpose is to enable an instructor who does not know any programming language to easily teach robot movements and operation content to a robot without using a teach pendant. This method for generating a robot operation program includes a step, using a GUI, for sequentially executing in a plurality of template element operation programs the feature of displaying a variable specification screen for specifying a variable of a certain template element operation program, and then storing the template element operation program for which the variable was specified in a storage unit as a custom element operation program. The plurality of template element operation programs is configured so that: one or more finger position coordinates specifying a robot motion required for the element operation
(Continued)

corresponding to the program are included as variables; and the one or more finger position coordinates are all specified, thereby specifying the robot motion.

13 Claims, 11 Drawing Sheets

(52) U.S. Cl.
CPC .......... *B25J 9/1687* (2013.01); *G05B 19/425* (2013.01); *G05B 2219/34202* (2013.01); *G05B 2219/40099* (2013.01); *G05B 2219/40392* (2013.01); *G05B 2219/40395* (2013.01)

(58) Field of Classification Search
CPC . G05B 2219/40099; G05B 2219/34202; B25J 9/161; B25J 9/1687; B25J 9/1682; B25J 9/1664; B25J 9/1656; B25J 9/1658; B25J 9/1661; B25J 9/1671
See application file for complete search history.

(56) References Cited

U.S. PATENT DOCUMENTS

| | | | | |
|---|---|---|---|---|
| 2009/0319067 | A1* | 12/2009 | Betsche | B29C 45/762 700/97 |
| 2012/0127165 | A1* | 5/2012 | Evans | G06T 19/00 345/419 |
| 2012/0197438 | A1* | 8/2012 | Ogami | B25J 9/1682 700/258 |
| 2012/0317535 | A1 | 12/2012 | Schmirgel et al. | |
| 2014/0172167 | A1 | 6/2014 | Matsukuma et al. | |
| 2014/0298231 | A1* | 10/2014 | Saito | G06F 3/0484 715/771 |
| 2015/0328772 | A1* | 11/2015 | Kato | B25J 9/1664 700/257 |
| 2015/0352720 | A1* | 12/2015 | Iizuka | B25J 9/1682 700/245 |

FOREIGN PATENT DOCUMENTS

| | | |
|---|---|---|
| JP | H08-137532 A | 5/1996 |
| JP | H08-194518 A | 7/1996 |
| JP | 2000-010614 A | 1/2000 |
| JP | 2004-355195 A | 12/2004 |
| JP | 2007-242054 A | 9/2007 |
| JP | 2014-128857 A | 7/2014 |
| JP | 2014-166681 A | 9/2014 |
| WO | 2006/043873 A1 | 4/2006 |
| WO | 2008/119383 A1 | 10/2008 |

OTHER PUBLICATIONS

Mar. 31, 2015 Written Opinion of the International Search Authority issued in Patent Application No. PCT/JP2014/006511.

* cited by examiner

Fig. 10

(NEW FILE / EDIT / SELECT MODE / OPTION MENU)

○ WORK MANAGEMENT

WORK (5)
- AIR-CONDITIONING MACHINE 1
- CAMERA 1
- LENS 1
- COMPONENT 1
- MOBILE PHONE BOARD 1

Fig. 11

(NEW FILE / EDIT / SELECT MODE / OPTION MENU)

○ WORK MANAGEMENT

WORK > AIR-CONDITIONING MACHINE 1
- WAIT FOR SIGNAL
- SHIFT POSITION TO POINT A
- SHIFT POSITION
- MOUNT
- SHIFT POSITION
- HOLD
- RELEASE

Fig. 12

ROBOT MOTION PROGRAM GENERATING METHOD AND ROBOT MOTION PROGRAM GENERATING APPARATUS

TECHNICAL FIELD

The present invention relates to a robot motion program generating method and a robot motion program generating apparatus.

BACKGROUND ART

Conventionally, robot teaching has been performed by using a teach pendant.

In recent years, there is a known robot motion program generating technique in which conventional character-based expressions and editing of a robot language are replaced with graphical expressions and editing by using a GUI (graphical user interface) (see Patent Literature 1, for example). There is also a known technique of adjusting parameters relating to a workpiece fitting operation by using a GUI (see Patent Literature 2, for example).

CITATION LIST

Patent Literature

PTL 1: Japanese Laid-Open Patent Application Publication No. 2007-242054
PTL 2: Japanese Laid-Open Patent Application Publication No. 2014-166681

SUMMARY OF INVENTION

Technical Problem in recent years, assembling a product in an assembly line in which a human and a robot coexisting together share a series of work processes has been drawing attention. In such an assembly line, there are cases where the contents of the work are frequently changed in accordance with the type of the product to be assembled and changes in the work processes.

However, in the case of performing robot teaching by using a teach pendant, the teaching takes time, and also, the teacher needs to be capable of using a programming language. In the techniques disclosed in Patent Literatures 1 and 2, teaching a motion to a robot is performed by a teach pendant in a conventional manner. Although parameters are adjusted by using a GUI in Patent Literature 2, this parameter adjustment is performed by actually controlling and operating the robot. The teacher needs to be capable of using a programming language, so long as teaching a motion to the robot is performed by using a teach pendant. In addition, labor hours are extended in the case of actually controlling and operating the robot for, for example, parameter adjustments to generate a robot teaching program.

In view of the above, an object of the present invention is to make it possible for a teacher who is unfamiliar with programming languages to readily teach a robot motions to be made and the contents of work to be performed by the robot without using a teach pendant.

Solution to Problem

The inventors of the present invention conducted diligent studies on a method that allows a teacher who is unfamiliar with programming languages to readily teach a robot motions to be made and the contents of work to be performed by the robot without using a teach pendant.

First, studies were conducted on eliminating the necessity of a teach pendant. As part of the studies, off-line teaching was looked into. However, generally speaking, in the case of adopting off-line teaching, since it is difficult to imagine the orientation of the robot in the off-line teaching, the off-line teaching does not match intended motions of the robot. Therefore, motion check using the actual robot, or modification of a motion program generated through the off-line teaching, is necessary.

Meanwhile, product assembling work is the work divided into a group of work processes, each of which is relatively simple work. Each process is defined so that a human can carry out the process in predetermined steps. Accordingly, for example, in a case where a dual-arm robot in a size similar to a human is caused to perform a work process in an assembly line instead of a worker, the orientation of the dual-arm robot performing the work process can be imagined from the orientation of a worker performing the work process.

Accordingly, in such a case, even if off-line teaching is adopted, a motion program that relatively matches intended motions of the robot can be generated. This is the first point of view of the inventors of the present invention.

Next, studies were conducted on allowing a teacher unfamiliar with programming languages to readily teach a robot motions to be made and the contents of work to be performed by the robot. In the studies, the inventors of the present invention paid attention to the following points. Product assembling work is the work divided into a group of work processes, each of which is relatively simple work, and each process is defined so that it can be carried out in predetermined steps. Therefore, by programming each process in advance, any combinations of the processes can be made, and thereby an overall robot motion program can be generated. In addition, the generation of an overall robot motion program by making combinations of the processes can be programmed in advance. This makes it possible for a teacher who is unfamiliar with programming languages to teach a robot motions to be made and the contents of work to be performed by the robot. In addition, the use of a GUI allows the teacher to readily perform the teaching. These are the second points of view of the inventors of the present invention.

The present invention has been made based on these points of view.

A robot motion program generating method according to one aspect of the present invention is a method of generating a whole motion program that causes a robot including an arm to perform whole work that is an entirety of work to be performed by the robot, the method generating the whole motion program by using a program generating apparatus including: a GUI controller configured to display a GUI (graphical user interface) on a predetermined screen and receive a user input; a storage unit; and a program generator. A plurality of template elemental motion programs, which correspond to a plurality of pieces of elemental work forming the whole work, respectively, and each of which contains one or more parameters, are stored in the storage unit in advance, and each template elemental motion program is configured such that when all of the one or more parameters are specified, the corresponding piece of elemental work is performable by the robot. The method includes: a step A of performing operations for each of the plurality of template elemental motion programs stored in the storage unit sequentially, the operations including displaying a parameter specifying screen by using the GUI, the parameter specifying screen being a screen for specifying all of the one or more parameters of a particular template elemental motion program, and thereafter causing the storage unit to store the particular template elemental motion program as a custom elemental motion program when the one or more parameters of the particular template elemental motion program are specified by using the parameter specifying screen; and a step B of generating the whole motion program by the program generator based on a plurality of the custom elemental motion programs stored in the storage unit, the whole motion program containing the plurality of the custom elemental motion programs. The plurality of template elemental motion programs include a template elemental motion program that contains, at least, for its corresponding piece of elemental work, one or more sets of hand end position coordinates as the one or more parameters, the one or more sets of hand end position coordinates defining a necessary movement of the robot for the corresponding piece of elemental work, the template elemental motion program being configured such that the movement of the robot is specified when all of the one or more sets of hand end position coordinates are specified.

The movement of the robot herein includes position shifting and orientation changing of the robot. As one example, the one or more sets of hand end position coordinates defining the movement of the robot indicate one or more teaching points.

According to the above configuration, a teacher displays the parameter specifying screen of a particular template elemental motion program by using the GUI, and thereafter, when the teacher specifies parameters by using the parameter specifying screen, the particular template elemental motion program, the parameters of which have been specified, is stored in the storage unit as a custom elemental motion program. When these operations have been performed for each of the plurality of template elemental motion programs stored in the storage unit sequentially, the program generator generates a whole motion program containing the plurality of custom elemental motion programs stored in the storage unit. The plurality of template elemental motion programs include a template elemental motion program that contains, at least, for its corresponding piece of elemental work, hand end position coordinates (teaching points) as parameters, the hand end position coordinates defining a necessary movement of the robot for the corresponding piece of elemental work, the template elemental motion program being configured such that the movement of the robot is specified when the hand end position coordinates are specified. Therefore, even if the teacher is unfamiliar with the robot language, the teacher can generate a motion program that relates to movements/motions and that contains hand end position coordinates (teaching points) of the robot by merely specifying the parameters of the template elemental motion programs by using the GUI. Then, by downloading the motion program on the controller of the robot, teaching of the movements/motions to the robot can be performed. Thus, even if the teacher is unfamiliar with the robot language, the teacher can readily perform robot teaching.

The plurality of template elemental motion programs may further include a template elemental motion program that contains one or more parameters defining a content of elemental work corresponding to the program and that is configured such that the content of the elemental work is specified when all of the one or more parameters are specified.

According to the above configuration, the plurality of template elemental motion programs further include a template elemental motion program that contains parameters defining a content of elemental work corresponding to the program and that is configured such that the content of the elemental work is specified when the parameters are specified. Therefore, even if the teacher is unfamiliar with the robot language, the teacher can generate a motion program that relates to both movements/motions and the contents of elemental work and that contains hand end position coordinates (teaching points) of the robot by merely specifying the parameters of the template elemental motion programs by using the GUI. Then, by downloading the motion program on the controller of the robot, teaching of both the movements/motions and the contents of elemental work to the robot can be performed.

The step A may include a step of displaying a program selection screen by using the GUI, the program selection screen being a screen for selecting one of the plurality of template elemental motion programs. The one template elemental motion program, which is selected by using the program selection screen in the program selection screen displaying step, may be the particular template elemental motion program.

According to the above configuration, by selecting an intended set of template elemental motion programs from among the plurality of template elemental motion programs, the teacher can readily create intended whole work to be performed by the robot and readily generate a motion program that causes the robot to perform the intended whole work.

A plurality of pieces of whole work corresponding to a plurality of robots, respectively, may be stored in the storage unit in association with the plurality of robots, respectively, and the plurality of template elemental motion programs corresponding to each piece of whole work may be stored in the storage unit in association with a corresponding one of the plurality of robots. The method may include a step of displaying a robot selection screen by using the GUI, the robot selection screen being a screen for selecting one of the plurality of robots. The step A and the step B may be performed for the one robot, which is selected by using the robot selection screen in the robot selection screen displaying step.

According to the above configuration, even if the teacher is unfamiliar with the robot language, the teacher can readily perform teaching of the plurality of robots by using the GUI.

The storage unit may be layered and include a layer for the robot or the plurality of robots, a layer for the whole work, and a layer for the elemental work, which are arranged in this order such that, among the layers, the layer for the robot or the plurality of robots is a top layer and the layer for the elemental work is a bottom layer. Each robot, each piece of whole work, and each piece of elemental work, which are constituents of the respective layers, may be assigned identification names so as to be identifiable from one another. The storage unit may store the plurality of template elemental motion programs, such that the plurality of template elemental motion programs correspond to the plurality of pieces of elemental work of the bottom layer, respectively.

According to the above configuration, the robot(s), the whole work, and the template elemental motion programs can be specified by specifying the identification names of the constituents of these layers. This makes it possible to suitably perform, by using the GUI, displaying of a screen for specifying the robot(s), the whole work, and the template elemental motion programs and inputting for specifying the robot(s), the whole work, and the template elemental motion programs through the displayed screen.

The robot or each of the plurality of robots may be configured to output current hand end position coordinates. The step A may include inputting a value obtained from the outputted hand end position coordinates to the parameter specifying screen, which is a screen for specifying hand end position coordinates as the one or more parameters, to specify the outputted hand end position coordinates as the one or more parameters.

According to the above configuration, the teacher can readily specify the hand end position coordinates of the robot(s) by positioning the hand end(s) of the robot(s) at any intended teaching point(s). The outputted hand end position coordinates of the robot(s) may be inputted to the GUI by communication, or, for example, the teacher may look at the outputted hand end position coordinates of the robot(s) displayed by the robot controller(s), and input the coordinates via a specifying screen of the GUI.

The robot or each of the plurality of robots may include a plurality of arms configured to work in cooperation with each other. The whole work (hereinafter referred to as cooperative whole work) may be an entirety of work to be performed by the plurality of arms working in cooperation with each other. The plurality of pieces of elemental work (hereinafter referred to as a plurality of pieces of cooperative elemental work) may form the cooperative whole work. The template elemental motion programs (hereinafter referred to as template cooperative elemental motion programs) may correspond to the respective pieces of cooperative elemental work. The custom elemental motion programs (hereinafter referred to as custom cooperative elemental motion programs) may correspond to the respective template cooperative elemental motion programs. The whole motion program (hereinafter referred to as a cooperative whole motion program) may correspond to the custom cooperative elemental motion programs. The template cooperative elemental motion programs may include a template cooperative elemental motion program that contains, at least, for its corresponding piece of cooperative elemental work, one or more sets of hand end position coordinates of each of the plurality of arms of the robot as the one or more parameters, the one or more sets of hand end position coordinates defining a necessary movement of each arm for the corresponding piece of cooperative elemental work, the template cooperative elemental motion program being configured such that the movements of the plurality of respective arms of the robot are specified when all of the one or more sets of hand end position coordinates of each arm are specified.

The movements of the plurality of respective arms of the robot herein include position shifting and orientation changing of the robot. As one example, the one or more sets of hand end position coordinates of each arm, which define the movement of the arm, indicate one or more teaching points.

According to the above configuration, even if the teacher is unfamiliar with the robot language, the teacher can readily perform teaching of the robot including the plurality of arms that perform cooperative motions.

The robot motion program generating method may further include a step of generating a plurality of the whole motion programs for the respective alms of the robot including the plurality of arms, each whole motion program corresponding to an independent motion of one of the plurality of arms. The cooperative whole motion program corresponding to cooperative motions of the plurality of arms, and the whole motion programs each corresponding to an independent motion of one of the plurality of arms, may be switched with each other in response to a predetermined action serving as a trigger.

According to the above configuration, even if the teacher is unfamiliar with the robot language, the teacher can readily perform teaching of the robot including the plurality of arms in a manner to switch between teaching of cooperative motions of the plurality of arms and teaching of independent motions of the respective arms.

The cooperative motions may include a motion for rotating or translating a workpiece.

This configuration makes it possible to readily teach the multiple-arm robot the motion for rotating or translating the workpiece.

The one or more parameters may contain a motion speed, a position shifting technique, and a waiting time of the robot or each of the plurality of robots.

This configuration allows the teacher to readily set parameters relating to particular motions of the robot by using the GUI.

The program generating apparatus may be a smartphone or a tablet personal computer.

This configuration allows the teacher to readily carry around the terminal (the program generating apparatus) and perform the teaching by intuitive and simple operations.

The robot or each of the plurality of robots may be a robot for use in product assembly. The whole work may be product assembling work. Each piece of elemental work may be one of work processes forming the product assembling work.

Generally speaking, in the case of adopting off-line teaching, since it is difficult to imagine the orientation of the robot in the off-line teaching, the off-line teaching does not match intended motions of the robot. Therefore, motion check using the actual robot, or modification of a motion program generated through the off-line teaching, is necessary.

Meanwhile, product assembling work is the work divided into a group of work processes, each of which is relatively simple work. Each process is defined so that a human can carry out the process in predetermined steps. Accordingly, for example, in a case where a dual-arm robot in a size similar to a human is caused to perform a work process in an assembly line instead of a worker, the orientation of the dual-arm robot performing the work process can be imagined from the orientation of a worker performing the work process.

Accordingly, in such a case, even if off-line teaching is adopted, a motion program that relatively matches intended motions of the robot can be generated. Therefore, in the case of performing product assembling work with use of a robot, the present invention in which one type of off-line teaching is performed by using a GUI is suitably applicable.

A robot motion program generating apparatus according to another aspect of the present invention is a robot motion program generating apparatus for generating a whole motion program that causes a robot including an arm to perform whole work that is an entirety of work to be performed by the robot, the apparatus including: a GUI controller configured to display a GUI on a predetermined screen and receive a user input; a storage unit; a program generator; and a customizer. A plurality of template elemental motion programs, which correspond to a plurality of pieces of elemental work forming the whole work, respectively, and each of which contains one or more parameters, are stored in the storage unit in advance, and each template elemental motion program is configured such that when all of the one or more parameters are specified, the corresponding piece of elemental work is performable by the robot. The customizer is configured to perform operations for each of the plurality of template elemental motion programs stored in the storage unit sequentially, the operations including displaying a parameter specifying screen by using the GUI, the parameter specifying screen being a screen for specifying all of the one or more parameters of a particular template elemental motion program, and thereafter causing the storage unit to store the particular template elemental motion program as a custom elemental motion program when the one or more parameters of the particular template elemental motion program are specified by a user by using the parameter specifying screen. The program generator is configured to generate the whole motion program based on a plurality of the custom elemental motion programs stored in the storage unit, the whole motion program containing the plurality of the custom elemental motion programs. The plurality of template elemental motion programs include a template elemental motion program that contains, at least, for its corresponding piece of elemental work, one or more sets of hand end position coordinates as the one or more parameters, the one or more sets of hand end position coordinates defining a necessary movement of the robot for the corresponding piece of elemental work, the template elemental motion program being configured such that the movement of the robot is specified when all of the one or more sets of hand end position coordinates are specified.

Advantageous Effects of Invention

The present invention makes it possible for a teacher who is unfamiliar with programming languages to readily teach a robot motions to be made and the contents of work to be performed by the robot without using a teach pendant.

The above and other objects, features, and advantages of the present invention will more fully be apparent from the following detailed description of preferred embodiments with accompanying drawings.

BRIEF DESCRIPTION OF DRAWINGS

FIG. 10 shows one example of a work selection screen displayed by using the GUI.

FIG. 11 shows one example of a work selection screen displayed by using the GUI.

FIG. 12 shows one example of a parameter setting screen displayed by using the GUI.

DESCRIPTION OF EMBODIMENTS

Figure 1:
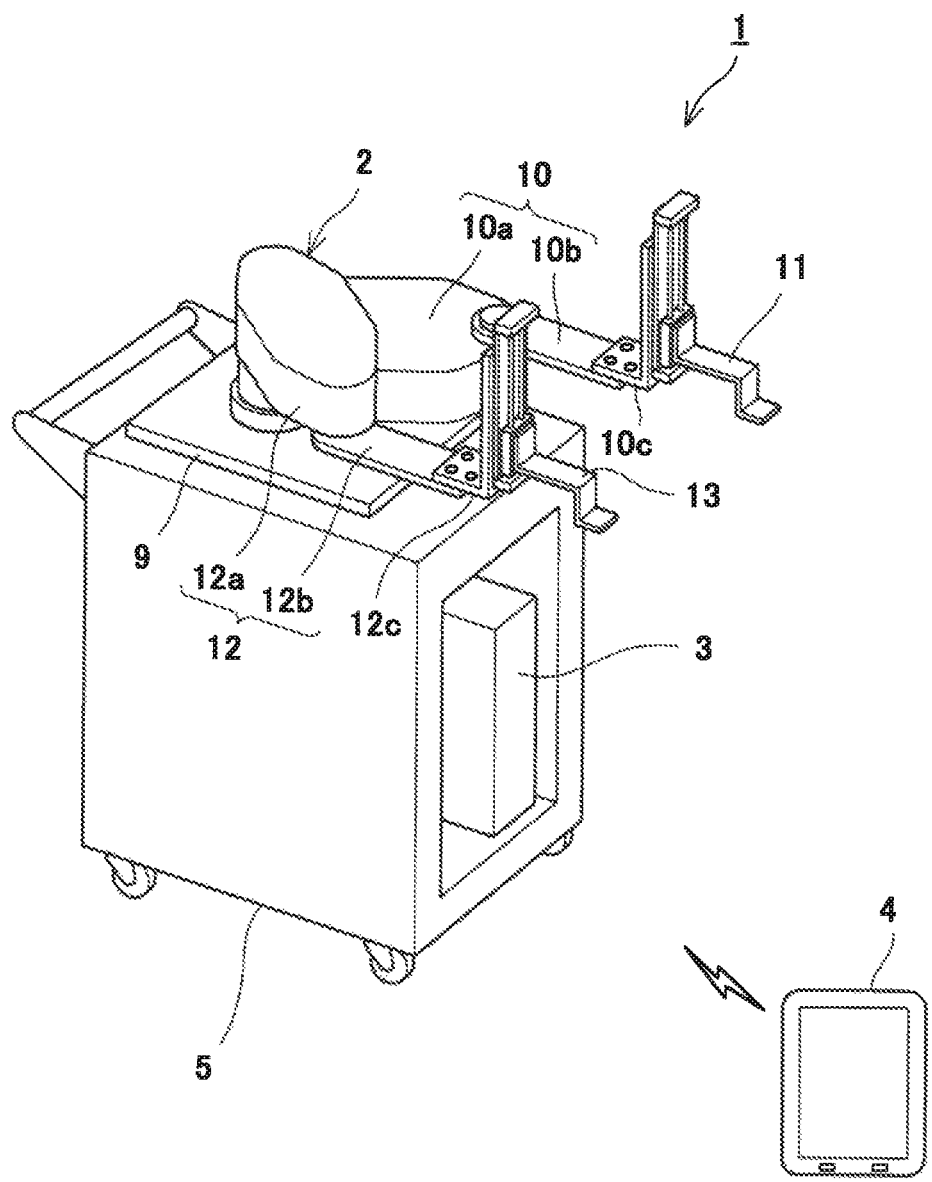
FIG. 1 is a perspective view showing a configuration of a robot teaching system including a robot motion program generating apparatus according to one embodiment of the present invention.

Hereinafter, embodiments of the present invention are described with reference to the drawings. In the drawings, the same or corresponding elements are denoted by the same reference signs, and repeating the same descriptions is avoided below.

FIG. 1 is a perspective view showing a configuration of a robot teaching system according to Embodiment 1. As shown in FIG. 1, a robot teaching system 1 includes: a robot body (hereinafter simply referred to as a robot) 2; a controller 3 configured to control the robot 2; and a motion program generating apparatus 4 communicably connected to the controller 3. The robot teaching system 1 is a system configured to teach a motion to the robot 2 in accordance with a motion program,

[Robot]

The robot 2 includes (one or more) robot arms formed by coupling a plurality of links by joints. In the present embodiment, the robot 2 is a dual-arm SCARA robot with coaxial two arms, and is in a size similar to a human. The robot 2 includes: a lower arm 10 disposed on a base 9; and an upper arm 12 disposed above the lower arm 10. For example, the robot 2 works while coexisting with other workers in an assembly line.

The lower arm 10 is configured such that a first link 10a and a second link 10b are coupled by a rotary joint. An L-shaped flange 10c is mounted to the distal end of the second link 10b of the lower arm 10. A first end effector 11 is coupled to the flange 10c by a prismatic joint.

The upper arm 12 is configured such that a first link 12a and a second link 12b are coupled by a rotary joint. An L-shaped flange 12c is mounted to the distal end of the second link 12b of the upper arm 12. A second end effector 13 is coupled to the flange 12c by a prismatic joint. It should be noted that the shapes of the first end effector 11 and the second end effector 13 are not limited to the shapes shown in FIG. 1. Alternatively, the first end effector 11 and the second end effector 13 may be different end effectors suitable for assembling work, such as hands.

Figure 2:
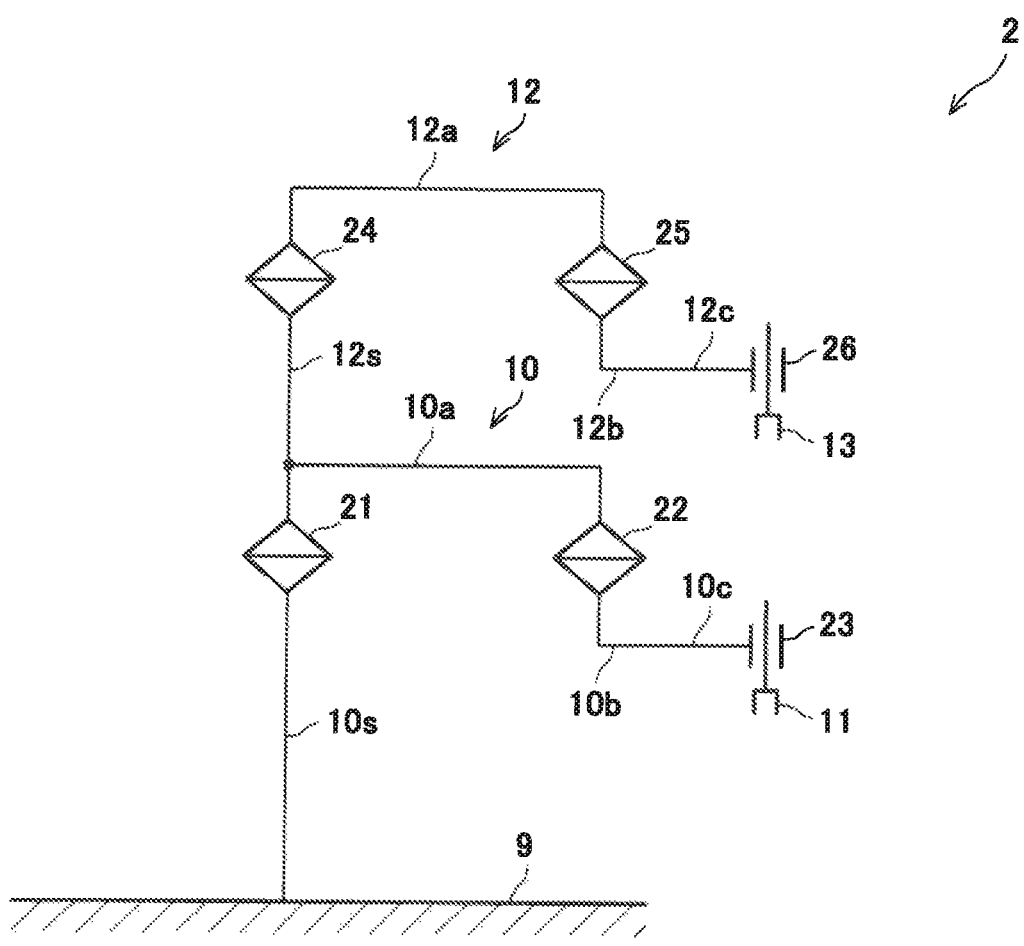
FIG. 2 schematically shows joint structures of robot arms of FIG. 1.

FIG. 2 schematically shows joint structures of the lower arm 10 and the upper arm 12 of the robot 2. As shown in FIG. 2, the lower arm 10 includes: a first axis 21 and a second axis 22, which are rotary joints; and a third axis 23, which is a translational (prismatic) joint. That is, the lower arm 10 has three degrees of freedom. The upper arm 12 includes: a fourth axis 24 and a fifth axis 25, which are rotary joints; and a sixth axis 26, which is a translational (prismatic) joint. That is, the upper arm 12 has three degrees of freedom. The joint axes 21 to 26 forming these arms incorporate, for example, encoders (not shown) that are one example of angle detectors capable of detecting the angles of the respective joints.

The lower arm 10 includes a supporting member 10s provided on the upper surface of the base 9, and one end of the first link 10a extending horizontally is coupled to the supporting member 10s via the first axis 21, which has a rotational axis vertical to the base 9. The other end of the first link 10a is coupled to one end of the second link 10b via the second axis 22, which has a vertical rotational axis. The second link 10b extends horizontally. The flange 10c is mounted to the other end of the second link 10b. The first end effector 11 is coupled to the flange 10c via the third axis 23, which has a vertical translational direction. In this manner, the first end effector 11 is configured such that the first end effector 11 can be lifted and lowered by the third axis 23 at the distal end of the second link 10b.

The upper arm 12 includes a supporting member 12s provided on the upper surface of the first link 10a of the lower arm 10, and one end of the first link 12a extending horizontally is coupled to the supporting member 12s via the fourth axis 24, which has a vertical rotational axis. The fourth axis 24 is disposed such that the rotational axis thereof coincides with the rotational axis of the first axis 21. The other end of the first link 12a is coupled to one end of the second link 12b via the fifth axis 25, which has a vertical rotational axis. The second link 12b extends horizontally. The flange 12c is mounted to the other end of the second link 12b. The second end effector 13 is coupled to the flange 12c via the sixth axis 26, which has a vertical translational direction. In this manner, the second end effector 13 is configured such that the second end effector 13 can be lifted and lowered by the sixth axis 26 at the distal end of the second link 12b. The reference position of the first end effector 11 and the reference position of the second end effector 13 are set on the same horizontal plane (see FIG. 1).

The axes 21 to 26 forming the lower arm 10 and the upper arm 12 are driven by a servo mechanism (not shown). The servo mechanism includes: drivers for driving the arms to be displaced; and a transmission mechanism for transmitting the motive power of the drivers to the arms. In the present embodiment, each driver is realized by an electric motor, for example, a servomotor. That is, the lower arm 10 and the upper arm 12 are configured to be moved by the servo mechanism in accordance with commands from the controller 3. In this example, the fourth axis 24 of the upper arm 12 is connected to the first axis 21 of the lower arm 10 via the supporting member 12s and the first link 10a of the lower arm 10, such that the fourth axis 24 and the first axis 21 share the same rotational axis. Accordingly, the fourth axis 24 is controlled such that the fourth axis 24 makes given rotation in addition to making rotation that offsets the rotation of the first axis 21.

[Controller]

Figure 3:
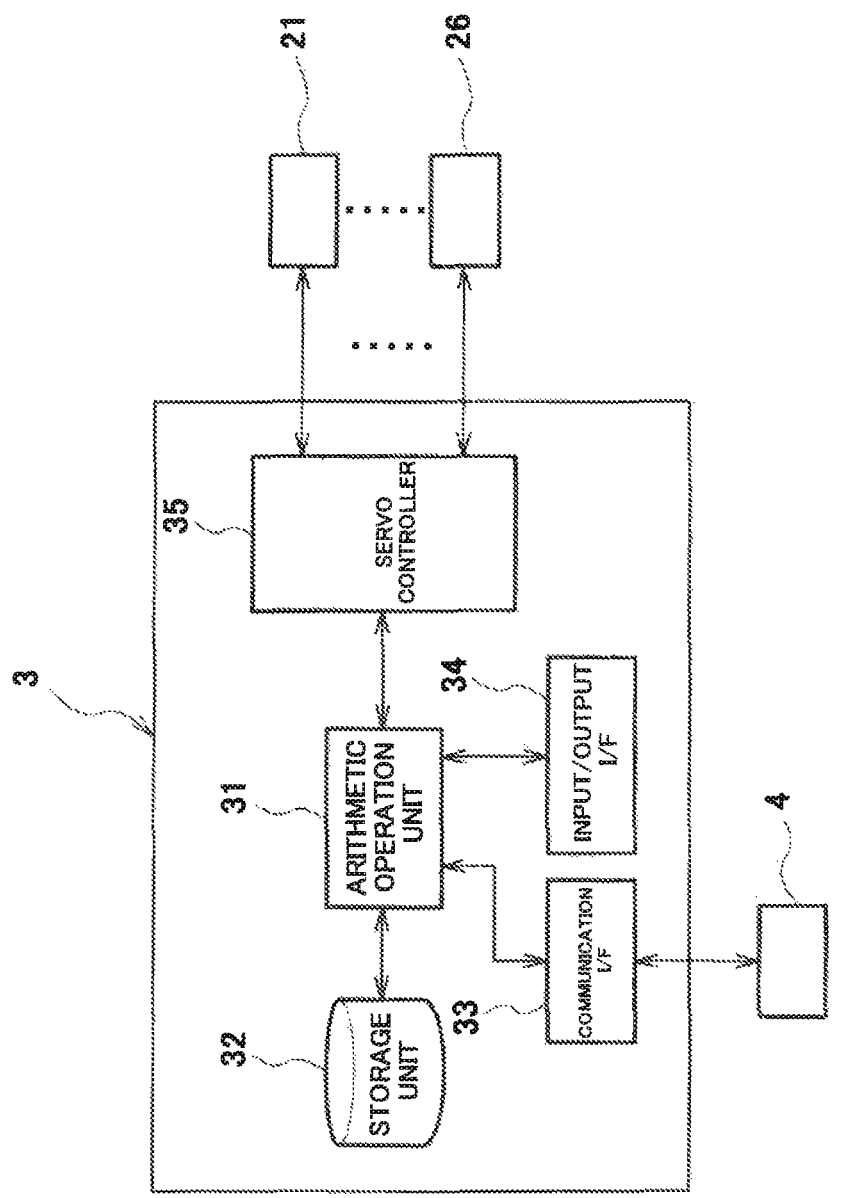
FIG. 3 is a block diagram showing a configuration of a controller of FIG. 1.

FIG. 3 is a block diagram showing a configuration of the controller 3 of FIG. 1. As shown in FIG. 3, the controller 3 includes an arithmetic operation unit 31, a storage unit 32, communication interface 33, an input/output interface 34, and a servo controller 35. The controller 3 is connected to the robot 2 via a control line (not shown), and is a robot controller including a computer, such as a microcontroller. The controller 3 need not be a single device, but may be constituted by a plurality of devices. The storage unit 32 stores information such as a basic program of the controller 3 and a motion program of the robot. The arithmetic operation unit 31 performs arithmetic processing for robot control, and generates control commands for controlling the robot 2. The servo controller 35 is configured to control the motion of each of the joint axes 21 to 26 of the robot 2 based on a control command generated by the arithmetic operation unit 31. The communication interface 33 is connected to the motion program generating apparatus 4. The controller 3 and the motion program generating apparatus 4 transmit and receive data to and from each other via the communication interface 33. As shown in a plan view of FIG. 4, the controller 3 sets a reference coordinate system (hereinafter referred to as a base coordinate system) B of the robot 2. In the coordinate system B, for example, an intersection point where a surface on which the base 9 is set and the rotational axis of the first axis 21 (see FIG. 2) of the lower arm 10 intersect with each other serves as the origin; the rotational axis of the first axis 21 serves as the Z-axis; an axis perpendicular to the Z-axis serves as the X-axis; and an axis perpendicular to the Z-axis and the X-axis serves as the Y-axis. A coordinate system with reference to the flange 10c, which is mounted to the distal end of the second link 10b of the lower arm 10, is a first flange coordinate system F1. A coordinate system with reference to the second flange 12c, which is mounted to the distal end of the second link 12b of the upper atm 12, is a second flange coordinate system F2.

The controller 3 is capable of specifying the positions and orientations of the flanges 10c and 12c in the shared base coordinate system B based on the angles of the joint axes 21 to 26 and the dimensions of the links forming the lower atm 10 and the upper arm 12. By storing, in advance, a vector in the first flange coordinate system F1 from the position of the flange 10c to a point on the first end effector 11 and a vector in the second flange coordinate system F2 from the position of the flange 12c to a point on the second end effector 13, the controller 3 can calculate the position of the hand end of the lower arm 10 and the position of the hand end of the upper arm 12 of the robot 2 with reference to the base coordinate system B. In the present embodiment, a teaching point that defines a motion of the lower arm 10 of the robot 2 is a distal end position P1 of the end effector 11 with reference to the base coordinate system B. A teaching point that defines a motion of the upper arm 12 of the robot 2 is a distal end position P2 of the end effector 13 with reference to the base coordinate system B. It should be noted that a vision sensor (not shown) may be additionally used in the robot teaching system 1, and thereby an arbitrary point in space excluding the robot may be set as a teaching point.

Movement of the robot 2 is specified as a result of one or more teaching points P1 and one or more teaching points P2 being specified. In this manner, a motion area 20 for the robot arms 10 and 12 can be set with reference to the base coordinate system B. In the present embodiment, the motion area 20 is rectangular when seen in a plan view, and is set such that the motion area 20 covers a worktable 5, which is placed in front of the robot 2.

Figure 4:
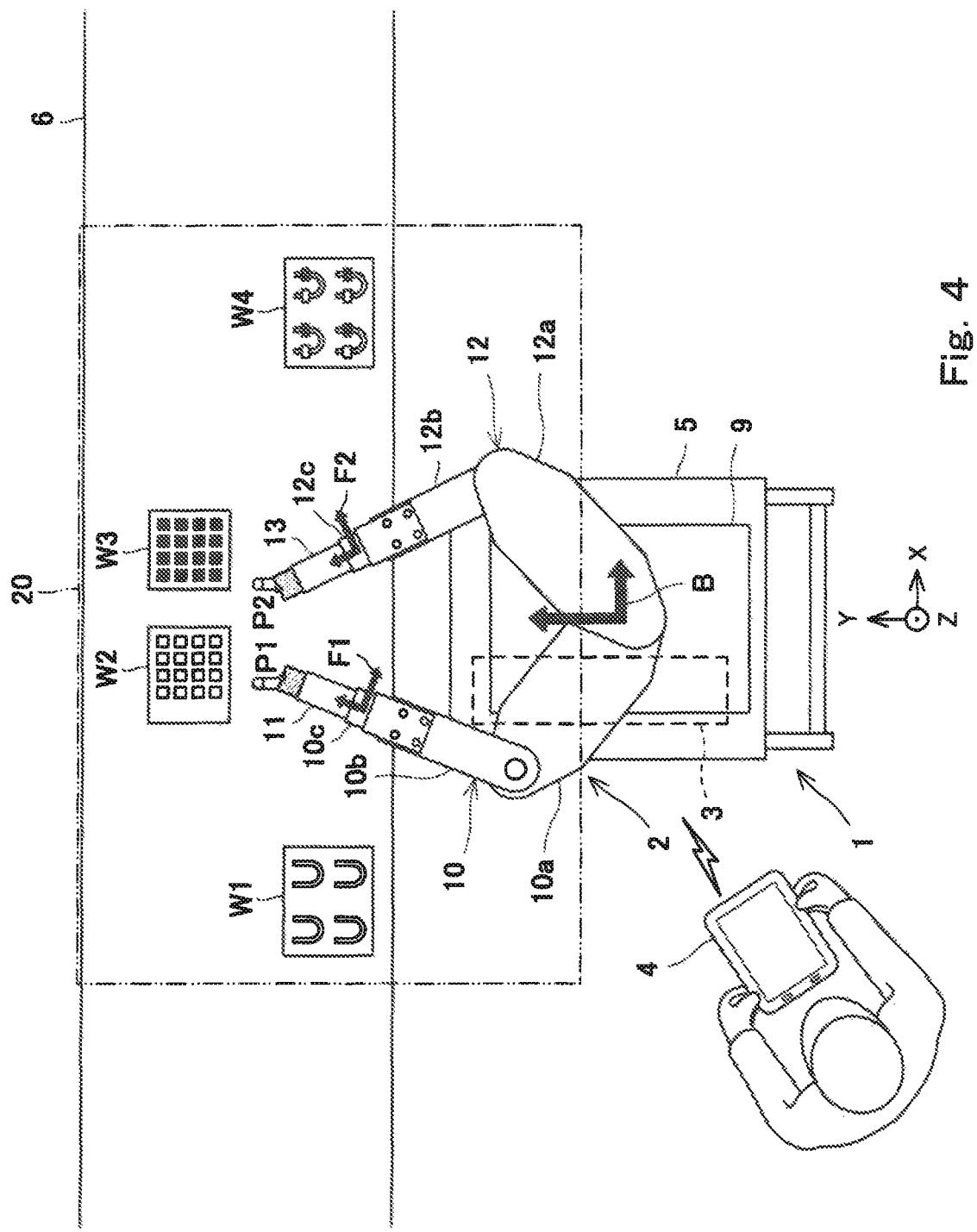
FIG. 4 is a plan view of the robot teaching system of FIG. 1.

A teacher teaches whole work to the robot 2. The whole work is the entirety of work to be performed by the robot 2 within the motion area 20. The robot 2 is a robot for use in product assembly, and the whole work to be perfhrmed by the robot is, for example, the work of assembling an air-conditioning machine. In this case, the whole work of the robot 2 is formed by a plurality of pieces of elemental work. Each piece of elemental work is, for example, an assembling process. In the example of FIG. 4, the pieces of elemental work are the work of assembling four kinds of components W1, W2, W3, and W4 placed on the worktable 5.

Generally speaking, in the case of adopting off-line teaching, since it is difficult to imagine the orientation of the robot in the off-line teaching, the off-line teaching does not match intended motions of the robot. Therefore, motion check using the actual robot, or modification of a motion program generated through the off-line teaching, is necessary.

Meanwhile, product assembling work is the work divided into a group of work processes, each of which is relatively simple work. Each process is defined so that a human can carry out the process in predetermined steps. Accordingly, in a case where the dual-arm robot 2 in a size similar to a human is caused to perform a work process in an assembly line instead of a worker as in the present embodiment, the orientation of the dual-arm robot performing the work process can be imagined from the orientation of a worker performing the work process.

Accordingly, in such a case, even if off-line teaching is adopted, a motion program that relatively matches intended motions of the robot can be generated. Therefore, in the case of performing product assembling work with use of a robot, the present invention in which one type of off-line teaching is performed by using a GUI is suitably applicable. Hereinafter, a specific description is given.

[Motion Program Generating Apparatus]

A teacher uses the motion program generating apparatus 4 to generate a whole motion program that causes the robot 2 to perform whole work, and teaches motions to the robot 2 through the controller 3. The teacher herein may be a system manager of the robot teaching system 1. The motion program generating apparatus 4 generates, modifies, and registers the whole motion program of the robot 2, or sets various parameters.

Figure 5:
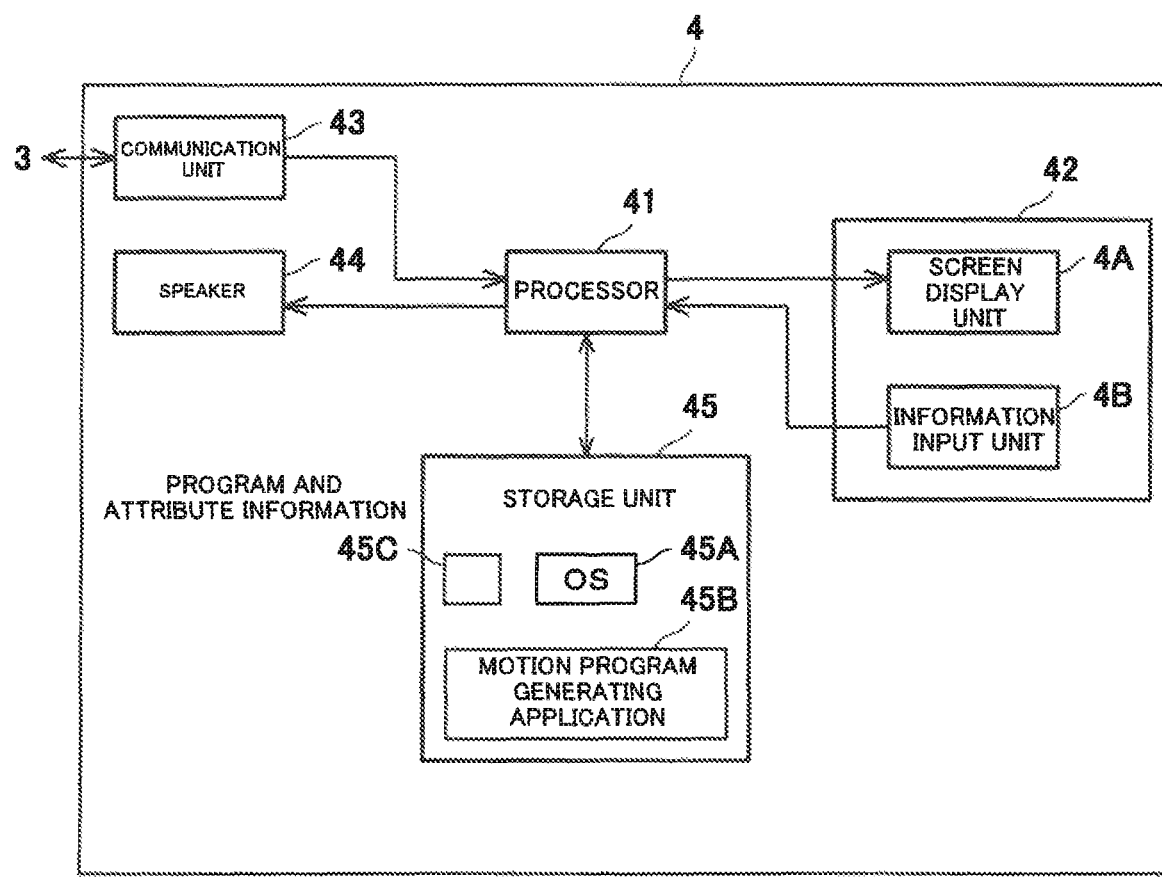
FIG. 5 is a block diagram showing a configuration of the motion program generating apparatus of FIG. 1.

FIG. 5 is a block diagram showing a hardware configuration of the motion program generating apparatus 4. As shown in FIG. 5, the motion program generating apparatus 4 includes a processor 41, a touch screen display 42, a communication unit 43, a speaker 44, and a storage unit 45, In the present embodiment, the motion program generating apparatus 4 is a tablet personal computer.

The processor 41 is an arithmetic operation device configured to perform various processing, and executes a basic program such as an OS 45A and a motion program generating application described below.

The touch screen display 42 includes a screen display unit 4A and an information input unit 4B. The screen display unit 4A includes a display device, such as a liquid crystal display. The screen display unit 4A displays characters, images, symbols, diagrams, etc., on its screen.

The information input unit 4B detects an information input to the screen by a user. In the present embodiment, the information input unit 4B detects, at least, a position where a finger, pen, stylus, or the like comes into contact with or comes close to the screen. The information input unit 4B may adopt any type of detection technique, such as capacitance-type detection technique.

The communication unit 43 communicates with the controller 3 by wired or wireless communication. The communication unit 43 supports one or a plurality of communication techniques. Examples of the communication technique(s) supported by the communication unit 43 include Ethernet (registered trademark) and a communication technique intended for mobile phones.

The speaker 44 outputs sounds. The tablet personal computer may further include an output terminal for outputting sounds through headphones (earphones), and may further include a microphone for inputting sounds.

The storage unit 45 stores: the operating system (OS) 45A, which assists the operation of applications; application programs (the term "application program" may be hereinafter shortened as "application") 45B run in the foreground or background; and program and attribute information 45C. The applications 45B include a motion program generating application according to the present embodiment, which generates a whole motion program of the robot by using a GUI. Each application, for example, causes the screen display unit 4A to display a screen by using the GUI, and causes the processor 41 to perform a process corresponding to a gesture made by the user, which is detected by the information input unit 4B. The applications are various, including those relating to games, music listening, video viewing, dictionaries, maps, learning and studying, etc. The applications are downloaded (installed) on the tablet terminal from an online market or the like and executed. The applications may be installed on the storage unit 45 through communication by the communication unit 43 or via a storage medium. The storage unit 45 is utilized also as a storage area for storing, for example, execution files and saved data of each application and as a work area for temporarily storing the results of processing by the processor 41. The storage unit 45 may include any storage medium. Examples of the storage medium include a semiconductor storage medium and a magnetic storage medium. The storage unit 45 may include a plurality of types of storage media. The storage unit 45 may include a storage device utilized as a temporary storage area, such as a RAM.

Figure 6:
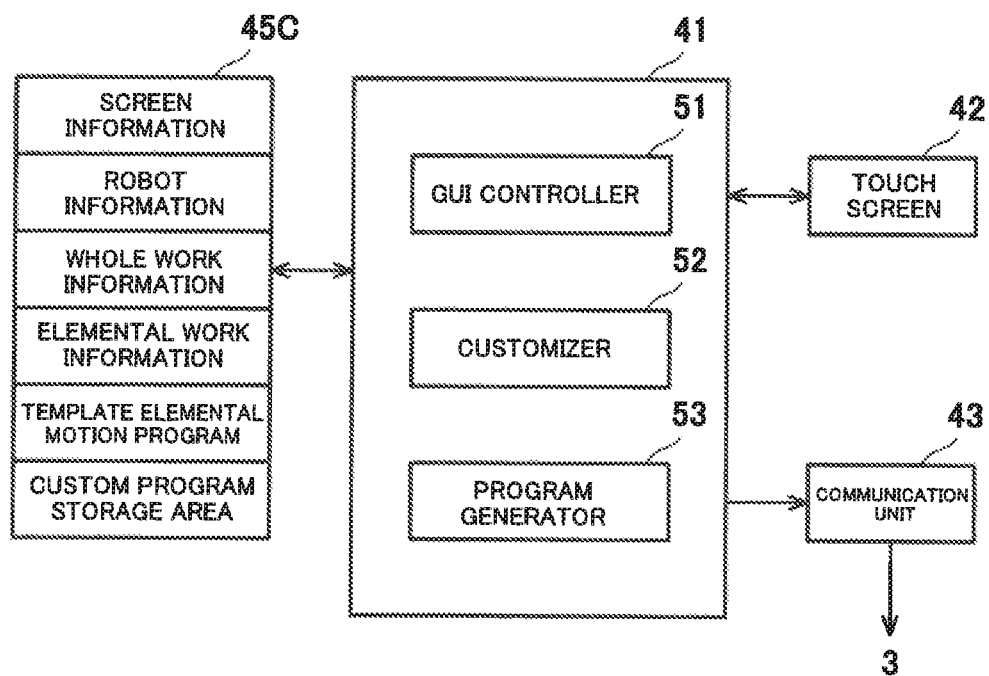
FIG. 6 is a block diagram showing a functional configuration example of a motion program generating application of FIG. 4.

FIG. 6 is a block diagram showing a functional configuration of the processor 41 when the motion program generating apparatus 4 executes the motion program generating application. As shown in FIG. 6, the processor 41 performs functions including those of a GUI controller 51, a customizer 52, and a motion program generator 53. The program and attribute information 45C contains screen information, robot information, whole work information, elemental work information, template elemental motion programs, and other information stored in a custom program storage area.

The screen information is image information displayed on the touch screen display 42 by the GUI controller 51. The robot information is basic information relating to (one or more) robots taught by the system 1. The whole work information is information relating to (one or more pieces of) whole work taught to each robot. The whole work is, for example, the work of assembling an air-conditioning machine, a camera, or the like. The elemental work information is information relating to (one or more pieces of) elemental work forming each piece of whole work. Examples of the elemental work include position shifting, mounting, holding, releasing, and waiting for a signal.

The template elemental motion programs are a list of programs corresponding to respective pieces of elemental work. Each template elemental motion program contains one or more parameters serving as one or more arguments for the corresponding piece of elemental work. Each template elemental motion program is written in a robot language in advance, such that when all of the one or more parameters are specified, the corresponding piece of elemental work is performable by the robot. Each template elemental motion program contains, at least, for its corresponding piece of elemental work, one or more sets of hand end position coordinates (i.e., one or more teaching points) as the one or more parameters, the one or more hand end position coordinates (teaching points) defining a necessary movement of the robot for the corresponding piece of elemental work, and the template cooperative elemental motion program is configured such that the movement of the robot is specified when all of the one or more sets of hand end position coordinates (teaching points) are specified.

The storage unit 45 is layered and includes a layer for the robot information, a layer for the whole work information, and a layer for the elemental work information, which are arranged in this order such that, among the layers, the layer for the robot information is the top layer and the layer for the elemental work information is the bottom layer. Each robot, each piece of whole work, and each piece of elemental work, which are constituents of the respective layers, are assigned identification names so as to be identifiable from one another. The storage unit 45 stores the plurality of template elemental motion programs, such that the plurality of template elemental motion programs correspond to the plurality of pieces of elemental work of the bottom layer, respectively.

In this example, a plurality of pieces of whole work corresponding to a plurality of robots, respectively, are stored in the storage unit 45 in association with the plurality of robots, respectively, and the plurality of template elemental motion programs corresponding to each piece of whole work are stored in the storage unit 45 in association with a corresponding one of the plurality of robots.

These pieces of information may be downloaded through a network, or inputted by the user, or obtained from the controller 3, or obtained from a storage medium.

The custom program storage area stores custom elemental motion programs and information relating to generated whole motion programs. The custom elemental motion programs herein are a list of programs, in which all of the one or more parameters of the template elemental motion programs are specified. The whole motion programs are a list of programs, each of which is generated based on (one or more) custom elemental motion programs, in which (one or more) parameters of (one or more) template elemental motion programs are specified.

The GUI controller 51 displays a predetermined screen on the touch screen display 42 by means of the GUI based on various information stored in the storage unit 45, and performs a, process corresponding to an operation by the user.

The customizer 52 is configured to perform operations for each of the plurality of template elemental motion programs stored in the storage unit 45 sequentially, the operations including displaying a parameter setting screen by using the GUI, the parameter setting screen being a screen for specifying all of the one or more parameters of a particular template elemental motion program, and thereafter causing the storage unit 45 to store the particular template elemental motion program as a custom elemental motion program when the one or more parameters of the particular template elemental motion program are specified by the user by using the parameter setting screen.

The program generator 53 is configured to generate a whole motion program based on a plurality of custom elemental motion programs stored in the storage unit 45, the whole motion program containing the plurality of custom elemental motion programs. The generated whole motion program is downloaded on the controller 3 via the communication unit 43 in accordance with an operation by the user.

[Motion Program Generating Steps]

Next, steps of generating a whole motion program by a teacher are described with reference to FIG. 7 to FIG. 13.

Figure 7:
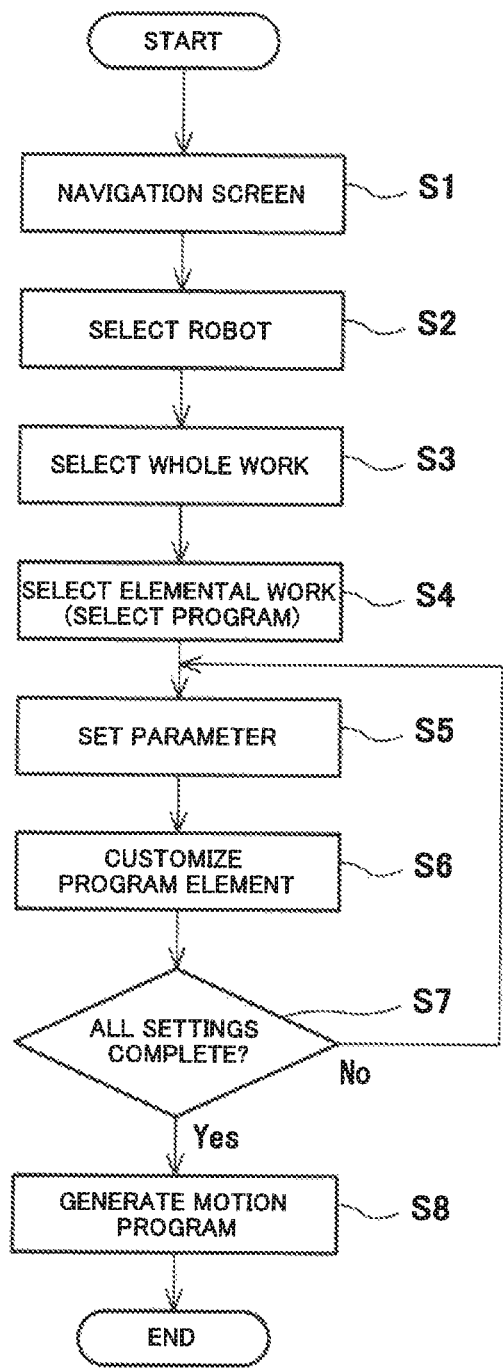
FIG. 7 is a flowchart showing steps of generating a motion program.
Figure 8:
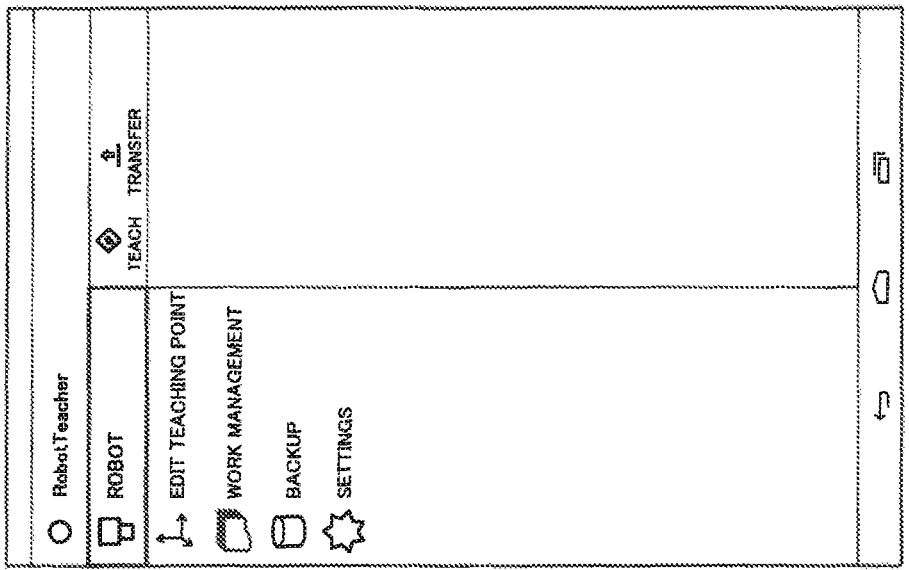
FIG. 8 shows one example of a navigation screen displayed by using a GUI.

First, the GUI controller 51 displays a navigation screen on the touch screen display 42 by using the GUI (step S1 of FIG. 7). Specifically, the teacher starts the motion program generating application on the tablet personal computer. After a certain period of time has elapsed since the start of the application, the start screen (not shown) automatically transitions to the navigation screen. FIG. 8 shows one example of the navigation screen displayed by using the GUI. As shown in FIG. 8, a list of selectable options, i.e., a selection menu, is displayed on the left half of the navigation screen. From the top of the selection menu, the following options are displayed in order: an option for setting information about the robot(s), which is/are the teaching object(s) (this option is displayed as "ROBOT" in FIG. 8); an option for editing teaching points (this option is displayed as "EDIT TEACHING POINT" in FIG. 8); an option for generating a whole motion program (this option is displayed as "WORK MANAGEMENT" in FIG. 8); an option for backing up data (this option is displayed as "BACKUP" in FIG. 8); and an option for performing basic settings of the terminal (this option is displayed as "SETTINGS" in FIG. 8). The teacher selects an intended option by touching characters or an icon on the screen. In the description below, typical steps of generating a motion program are described. It is, of course, understood that the teacher is allowed to select any option on the navigation screen.

Figure 9:
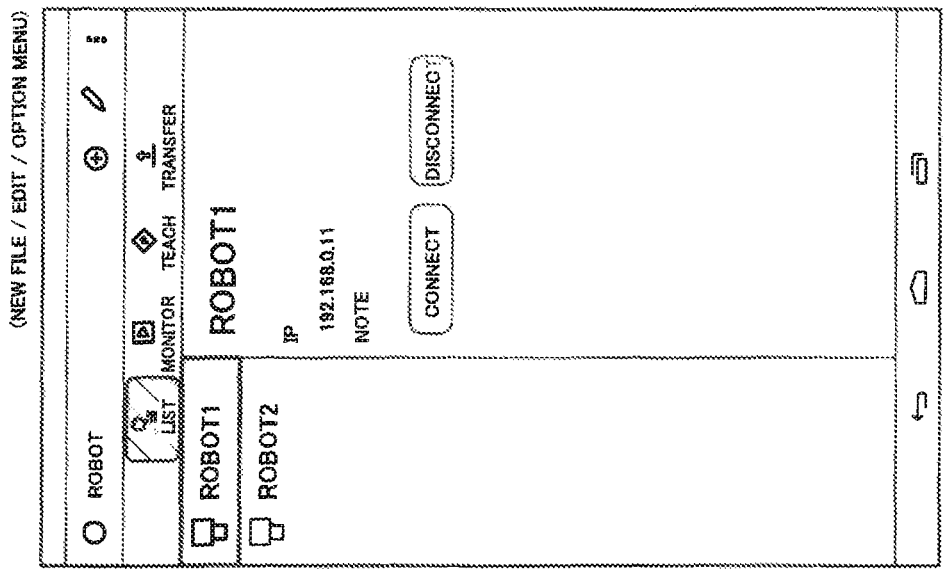
FIG. 9 shows one example of a robot selection screen displayed by using the GUI.

Next, the GUI controller 51 displays a robot selection screen on the touch screen display 42 by using the GUI (step S2). Specifically, this screen is displayed when the teacher selects "ROBOT" on the navigation screen of FIG. 8. FIG. 9 shows one example of the robot selection screen displayed by using the GUI. The robot selection screen herein displays information relating to the robot(s) that is/are connected to the tablet terminal and that can be taught. As shown in FIG. 9, a list of robots that can be selected is displayed on the left half of the robot selection screen. In this example, the robots are assigned identification names "ROBOT 1" and "ROBOT 2" for identifying these robots from each other. For example, "ROBOT 1" and "ROBOT 2" correspond to the lower arm 10 and the upper arm 12, respectively, of the robot 2 of FIG. 4. A selection menu for determining whether or not to connect to a selected robot (controller 3) is displayed on the right half of the robot selection screen. In the present embodiment, the generation of a whole motion program corresponding to independent motions of each of the lower arm 10 and the upper arm 12 of the robot 2 is described. It should be noted that by touching a tool bar on the top of the screen (FIG. 9 to FIG. 12), creation of a new file, editing, copying, or deletion of an existing file can be selected. Also, by touching a tab below the tool bar, another screen can be displayed.

Next, the GUI controller 51 displays a whole work selection screen on the touch screen display 42 by using the GUI (step S3). Specifically, this screen is displayed when the teacher selects "WORK MANAGEMENT" on the navigation screen of FIG. 8. FIG. 10 shows one example of the whole work selection screen displayed by using the GUI. As shown in FIG. 10, the whole work selection screen displays a list of products that can be selected. In this example, the products are assigned identification names "AIR-CONDITIONING MACHINE 1", "CAMERA 1", "LENS 1", "COMPONENT 1", and "MOBILE PHONE BOARD 1" for identifying different pieces of whole work from one another. The teacher selects a specific one of the products. In this example, the work of assembling the selected product is the whole work to be performed by the robot 2.

Next, the GUI controller 51 displays an elemental work selection screen (program selection screen) on the touch screen display 42 by using the GUI (step S4). Specifically, this screen is displayed when the teacher selects a specific product (e.g., identification name "AIR-CONDITIONING MACHINE 1") on the whole work selection screen of FIG. 10. FIG. 11 shows one example of the elemental work selection screen (program selection screen) displayed by using the GUI. As shown in FIG. 11, the elemental work selection screen (program selection screen) displays a list of pieces of elemental work that can be selected. In this example, the pieces of elemental work are assigned identification names "WAIT FOR SIGNAL", "SHIFT POSITION TO POINT A", "SHIFT POSITION", "MOUNT", "SHIFT POSITION", "HOLD", and "RELEASE" for identifying different pieces of elemental work from one another. It should be noted that a plurality of template elemental motion programs corresponding to the respective pieces of elemental work are stored in the storage unit 45 in advance. Each template elemental motion program contains one or more parameters, and is configured such that when all of the one or more parameters are specified, the corresponding elemental work is performable by the robot. The teacher can select a set of template elemental motion programs by selecting a set of predetermined pieces of elemental work (identification names) from among the aforementioned pieces of elemental work. In FIG. 11, a set of three pieces of elemental work (identification names "HOLD", "SHIFT POSITION", and "RELEASE") forming the work of transferring a component of an air-conditioning machine is selected as whole work.

Figure 12:
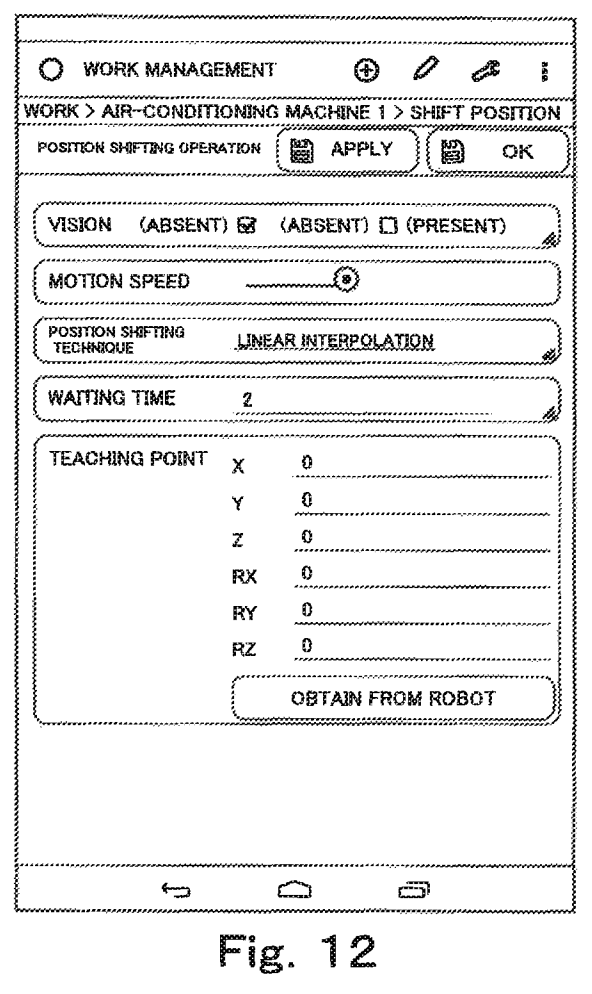

In addition, the customizer 52 displays a parameter setting screen on the touch screen display 42 by using the GUI (step S5). Specifically, the parameter setting screen is displayed when the teacher selects one piece of elemental work (e.g., identification name "SHIFT POSITION") from among the three pieces of elemental work (identification names "HOLD", "SHIFT POSITION", and "RELEASE") of FIG. 11, FIG. 12 shows one example of the parameter setting screen displayed by using the GUI. As shown in FIG. 12, the parameter setting screen displays a list of parameters that can be set in relation to position shifting. In this example, the teacher sets parameters for the following items: a motion speed of the robot, a position shifting technique, a waiting time, a teaching point of the robot, and a vision sensor.

The motion speed of the robot 2 can be set arbitrarily. In the present embodiment, the maximum motion speed of each of the lower arm 10 and the upper arm 12 of the robot 2 in the motion area 20 can be set arbitrarily (see FIG. 4), For example, in a case where an area in which the robot 2 and a human work and coexist together is set in the motion area 20, the maximum motion speed may be set to 250 mm/s, which is defined as low-speed control in ISO 10218-1.

The position shifting technique may be set to any technique. For example, an intended position shifting technique can be selected from among linear interpolation, circular interpolation, and PTP (point to point) control.

The waiting time can be set to any time. In this example, a waiting time before the robot 2 performs the aforementioned "SHIFT POSITION" motion can be set.

The teaching point of the robot can be set. In the present embodiment, the teaching point (hand end position coordinates) of the robot is obtained from the controller 3 by communication and displayed on the screen. However, as an alternative, the teacher may look at outputted hand end position coordinates of the robot displayed by the controller 3, and directly input the coordinates via the screen.

Presence or absence of a vision sensor can be set. In the robot teaching system 1, by using a vision sensor (not shown), an arbitrary point in space excluding the robot 2 may be set as a teaching point.

Next, when one or more parameters are specified on the parameter setting screen (FIG. 12) by the user, the customizer 52 stores the template elemental motion program, the one or more parameters of which have been specified, in the storage unit 45 as a custom elemental motion program (step S6). The customizer 52 performs the same operations for each of the other template elemental motion programs stored in the storage unit 45 sequentially (step S7). The teacher sets parameters by using the GUI for the other elemental motions (identification names "HOLD" and "RELEASE") in a similar manner, thereby customizing the template elemental motion programs corresponding to the respective pieces of elemental work, and stores them as custom elemental motion programs in the storage unit 45.

Based on the custom elemental motion programs stored in the storage unit 45, the program generator 53 generates a whole motion program containing these custom elemental motion programs (step S8).

Figure 13A:
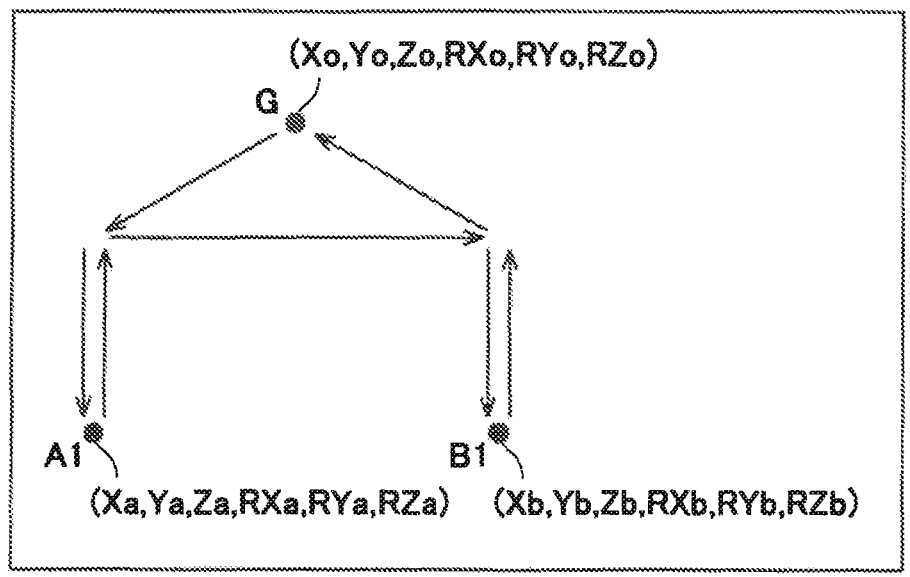
FIG. 13 is a schematic diagram illustrating one example of a generated whole motion program.

FIG. 13 is a schematic diagram illustrating one example of the generated whole motion program. As shown in FIG. 13A, the whole work performed by the robot is the work of transferring a component of an air-conditioning machine. The transferring work is made up of three kinds of elemental work (holding, position shifting, and releasing). Specifically, first, the robot shifts linearly from an origin G (Xa, Ya, Za, RXa, RYa, RZa) to a first predetermined position. Next, the robot shifts linearly from the first predetermined position to a point A1 (Xa, Ya, Za, RXa, RYa, RZa). At the point A1, the robot holds a workpiece, and shifts linearly to the first predetermined position. Then, while holding the workpiece, the robot shifts linearly to a second predetermined position. Next, the robot shifts linearly from the second predetermined position to a point B1 (Xb, Yb, Zb, RXh, RYb, RZb), and releases the workpiece. Subsequently, the robot shifts linearly from the point B1 (Xb, Yb, Zb, RXb, RYb, RZb) to the second predetermined position. Finally, the robot shifts linearly back to the origin G.

Figure 13B:
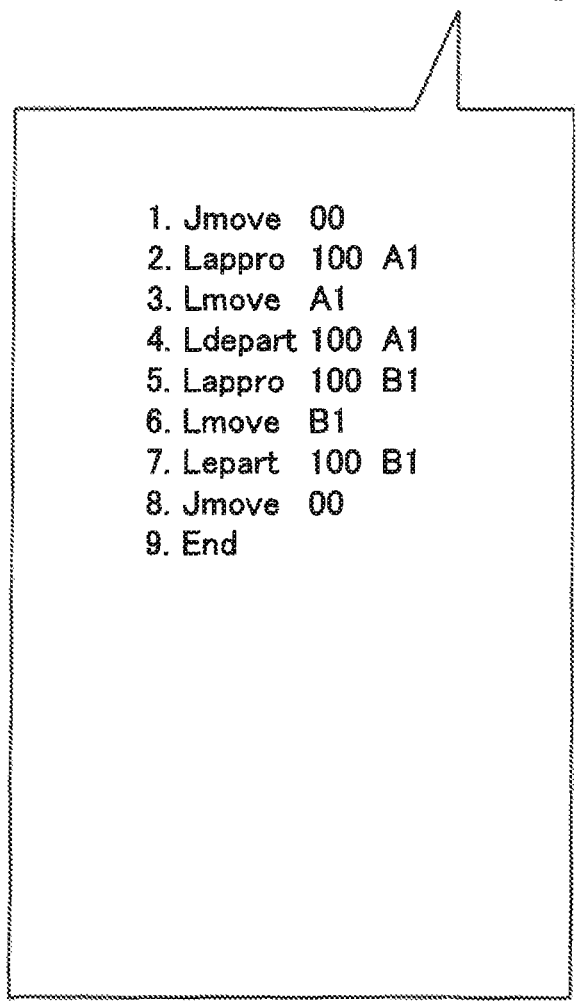
Figure 13C:
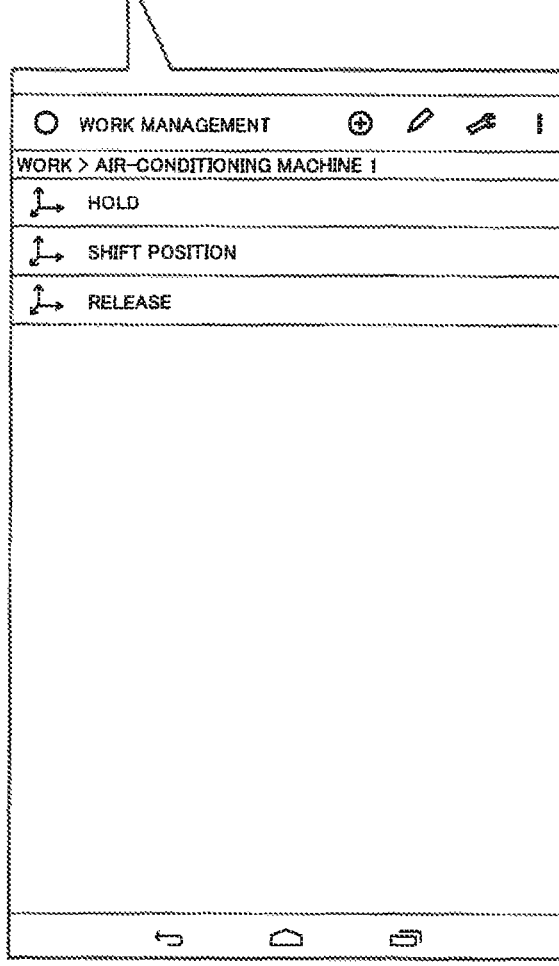

FIG. 13B shows the source of the generated whole motion program. FIG. 13C shows one example of an elemental work selection screen (program selection screen) corresponding to the source. Thus, the teacher can generate a motion program by simple operations using the GUI even if the teacher is unfamiliar with the robot language.

Finally, the teacher transfers the generated whole motion program to the controller 3. The teacher executes the transfer by touching a tab "TRANSFER" on the robot selection screen of FIG. 9. Based on the transferred motion program, the controller 3 teaches motions to the robot. The teacher can also play back the teaching results by touching a tab "MONITOR" on the robot selection screen of FIG. 9.

As described above, according to the present embodiment, the teacher displays the parameter setting screen (FIG. 12) of a particular template elemental motion program by using the GUI, and thereafter, when the teacher specifies parameters by using the parameter setting screen, the particular template elemental motion program, the parameters of which have been specified, is stored in the storage unit 45 as a custom elemental motion program. When these operations have been performed for each of the plurality of template elemental motion programs stored in the storage unit 45 sequentially, the program generator 53 generates a whole motion program containing the plurality of custom elemental motion programs stored in the storage unit 45. Therefore, even if the teacher is unfamiliar with the robot language, the teacher can generate a motion program that relates to movements/motions and that contains hand end position coordinates (teaching points) of the robot by merely specifying the parameters of the template elemental motion programs by using the GUI. Then, by downloading the motion program on the controller 3 of the robot, teaching of the movements/motions to the robot can be performed. Thus, even if the teacher is unfamiliar with the robot language, the teacher can readily perform robot teaching.

Moreover, according to the present embodiment, by displaying the elemental work selection screen (the program selection screen of FIG. 11) and selecting an intended set of template elemental motion programs from among the plurality of template elemental motion programs by using the GUI, the teacher can readily create intended whole work to be performed by the robot and readily generate a motion program that causes the robot to perform the intended whole work.

Other Embodiments

Although the generation of a whole motion program corresponding to independent motions of each of the lower arm 10 and the upper arm 12 of the robot 2 has been described in the present embodiment, the whole motion program is not thus limited. The above-described whole work, to which the whole motion program corresponds, may be whole work that is the entirety of work to be performed by a plurality of arms working in cooperation with each other, and the plurality of arms may be the lower arm 10 and the upper arm 12 of the robot 2 (such whole work is hereinafter referred to as "cooperative whole work"). In this case, the above-described plurality of pieces of elemental work form the cooperative whole work (these plurality of pieces of elemental work are hereinafter referred to as a plurality of pieces of "cooperative elemental work"); the above-described template elemental motion programs correspond to the respective pieces of cooperative elemental work (hereinafter, these template elemental motion programs are referred to as "template cooperative elemental motion programs"); the above-described custom elemental motion programs correspond to the respective template cooperative elemental motion programs (hereinafter, these custom elemental motion programs are referred to as "custom cooperative elemental motion programs"); and the above-described whole motion program corresponds to the custom cooperative elemental motion programs (hereinafter, this whole motion program is referred to as a "cooperative whole motion program").

The template cooperative elemental motion programs include a template cooperative elemental motion program that contains, at least, for its corresponding piece of cooperative elemental work, one or more sets of hand end position coordinates of each of the plurality of arms of the robot as the one or more parameters, the one or more sets of hand end position coordinates defining a necessary movement of each arm for the corresponding piece of cooperative elemental work, the template cooperative elemental motion program being configured such that the movements of the plurality of respective arms of the robot are specified when all of the one or more sets of hand end position coordinates of each arm are specified.

According to the above configuration, even if the teacher is unfamiliar with the robot language, the teacher can readily perform teaching of the robot including the plurality of arms that perform cooperative motions.

The cooperative motions may include a motion for rotating or translating a workpiece. This makes it possible to readily teach the multiple-arm robot the motion for rotating or translating the workpiece.

The whole motion program generation may further include a step of generating whole motion programs for the respective arms of the robot including the plurality of arms, each whole motion program corresponding to an independent motion of one of the plurality of arms. Then, the cooperative whole motion program corresponding to cooperative motions of the plurality of arms, and the whole motion programs each corresponding to an independent motion of one of the plurality of arms, may be switched with each other in response to a predetermined action serving as a trigger.

According to the above configuration, even if the teacher is unfamiliar with the robot language, the teacher can readily perform teaching of the robot including the plurality of arms in a manner to switch between teaching of cooperative motions of the plurality of arms and teaching of independent motions of the respective arms.

In the present embodiment, the motion program generating apparatus 4 is a tablet personal computer on which the robot motion program generating application is installed. However, as an alternative, the motion program generating apparatus 4 may be a smartphone. This allows the teacher to readily carry around the terminal and perform the teaching by intuitive and simple operations.

Further, in the present embodiment, the motion program generating apparatus 4 may be a general-purpose computer capable of executing software installed thereon, or may be dedicated hardware.

From the thregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

INDUSTRIAL APPLICABILITY

The present invention is useful for teaching motions to a robot.

REFERENCE SIGNS LIST 1 robot teaching system
2 robot body
3 controller
4 motion program generating apparatus titablet personal computer)
5 truck
6 worktable
9 base
10 lower arm
11 first end effector
12 upper arm
13 second end effector
21 to 26 first to sixth axes
31 arithmetic operation unit
32 storage unit
33 communication interface
34 input/output interface
35 servo controller
41 CPU
42 touch screen display
43 communication unit
44 speaker
45 storage unit
45A OS
45B motion program generating application
B base coordinate system
F1 first flange coordinate system
F2 second flange coordinate system

The invention claimed is:

1. A robot motion program generating method of generating a whole motion program that causes, by off-line teaching and without using a teach pendant, a dual-arm robot including two arms to perform whole work that is an entirety of work to be performed by the dual-arm robot, the method generating the whole motion program by using a program generating apparatus including (i) a graphical user interface (GUI) controller configured to display a graphical user interface (GUI) on a predetermined screen and receive a user input, (ii) a storage unit storing a plurality of template elemental motion programs, which correspond to a plurality of pieces of elemental work forming the whole work, respectively, and each of which contains one or more parameters, and each template elemental motion program of the plurality of template elemental motion programs is configured such that when all of the one or more parameters are specified, the corresponding piece of elemental work is performable by the dual-arm robot, and (iii) a program generator, the method comprising:

a step A of performing operations for each of the plurality of template elemental motion programs stored in the storage unit sequentially, the operations including displaying a parameter specifying screen by using the GUI, the parameter specifying screen being a screen for specifying all of the one or more parameters of a particular template elemental motion program, and thereafter causing the storage unit to store the particular template elemental motion program as a custom elemental motion program when the one or more parameters of the particular template elemental motion program are specified by using the parameter specifying screen; and a step B of generating the whole motion program by the program generator based on a plurality of the custom elemental motion programs stored in the storage unit, the whole motion program containing the plurality of the custom elemental motion programs, the plurality of template elemental motion programs including a template elemental motion program that contains, at least, for a corresponding piece of elemental work, one or more sets of hand end position coordinates as the one or more parameters, the one or more sets of hand end position coordinates defining a necessary movement of the dual-arm robot for the corresponding piece of elemental work, the template elemental motion program being configured such that the necessary movement of the dual-arm robot is specified when all of the one or more sets of hand end position coordinates are specified.

2. The robot motion program generating method according to claim 1, wherein the plurality of template elemental motion programs further include a template elemental motion program that contains one or more parameters defining a content of elemental work corresponding to the program and that is configured such that the content of the elemental work is specified when all of the one or more parameters are specified.

3. The robot motion program generating method according to claim 1, wherein:

the step A includes a step of displaying a program selection screen by using the GUI, the program selection screen being a screen for selecting one of the plurality of template elemental motion programs, and the selected one template elemental motion program of the plurality of template elemental motion programs, which is selected by using the program selection screen in the program selection screen displaying step, is the particular template elemental motion program.

4. The robot motion program generating method according to claim 1, wherein:

a plurality of pieces of whole work corresponding to a plurality of dual-arm robots, respectively, are stored in the storage unit in association with the plurality of dual-arm robots, respectively, the plurality of template elemental motion programs corresponding to each piece of whole work are stored in the storage unit in association with a corresponding one of the plurality of dual-arm robots, the method further comprises a step of displaying a robot selection screen by using the GUI, the robot selection screen being a screen for selecting one of the plurality of dual-arm robots, and the step A and the step B are performed for the selected one dual-arm robot, which is selected by using the robot selection screen in the robot selection screen displaying step.

5. The robot motion program generating method according to claim 1, wherein:

the storage unit is layered and includes a layer for the dual-arm robot, a layer for the whole work, and a layer for the elemental work, which are arranged in this order such that, among the layers, the layer for the dual-arm robot is a top layer and the layer for the elemental work is a bottom layer, the dual-arm robot, each piece of whole work, and each piece of elemental work, which are constituents of the respective layers, are assigned identification names so as to be identifiable from one another, and the storage unit stores the plurality of template elemental motion programs, such that the plurality of template elemental motion programs correspond to the plurality of pieces of elemental work of the bottom layer, respectively.

6. The robot motion program generating method according to claim 1, wherein:

the dual-arm robot is configured to output current hand end position coordinates, and the step A includes inputting a value obtained from the outputted hand end position coordinates to the parameter specifying screen, which is a screen for specifying hand end position coordinates as the one or more parameters, to specify the outputted hand end position coordinates as the one or more parameters.

7. The robot motion program generating method according to claim 1, wherein:

the dual-arm robot includes the two arms configured to work in cooperation with each other, the whole work, which is a cooperative whole work, is an entirety of work to be performed by the two arms working in cooperation with each other, the plurality of pieces of elemental work, which are a plurality of pieces of cooperative elemental work, form the cooperative whole work, the template elemental motion programs, which are a plurality of template cooperative elemental motion programs, correspond to the respective pieces of cooperative elemental work, the custom elemental motion programs, which are a plurality of custom cooperative elemental motion programs, correspond to the respective template cooperative elemental motion programs, the whole motion program, which is a cooperative whole motion program, corresponds to the custom cooperative elemental motion programs, and the template cooperative elemental motion programs include a template cooperative elemental motion program that contains, at least, for a corresponding piece of cooperative elemental work, one or more sets of hand end position coordinates of each of the two arms of the dual-arm robot as the one or more parameters, the one or more sets of hand end position coordinates defining a necessary movement of each arm for the corresponding piece of cooperative elemental work, the template cooperative elemental motion program being configured such that the movements of the two respective arms of the dual-arm robot are specified when all of the one or more sets of hand end position coordinates of each arm are specified.

8. The robot motion program generating method according to claim 7, further comprising a step of generating a plurality of the whole motion programs for the respective arms of the dual-arm robot including the two arms, each whole motion program corresponding to an independent motion of one of the two arms, wherein
the cooperative whole motion program corresponding to cooperative motions of the two arms, and the whole motion programs each corresponding to an independent motion of one of the two arms, are switched with each other in response to a predetermined action serving as a trigger.

9. The robot motion program generating method according to claim 8, wherein the cooperative motions include a motion for rotating or translating a workpiece.

10. The robot motion program generating method according to claim 1, wherein the one or more parameters contain a motion speed, a position shifting technique, and a waiting time of the dual-arm robot.

11. The robot motion program generating method according to claim 1, wherein the program generating apparatus is a smartphone or a tablet personal computer.

12. The robot motion program generating method according to claim 1, wherein:
the dual-arm robot is a dual-arm robot for use in product assembly,
the whole work is product assembling work, and
each piece of elemental work is one of work processes forming the product assembling work.

13. A robot motion program generating apparatus for generating a whole motion program that causes, by off-line teaching and without using a teach pendant, a dual-arm robot including two arms to perform whole work that is an entirety of work to be performed by the dual-arm robot, the apparatus comprising:

a graphical user interface (GUI) controller configured to display a graphical user interface (GUI) on a predetermined screen and receive a user input;
a storage unit storing a plurality of template elemental motion programs, which correspond to a plurality of pieces of elemental work forming the whole work, respectively, and each of which contains one or more parameters, and each template elemental motion program is configured such that when all of the one or more parameters are specified, the corresponding piece of elemental work is performable by the dual-arm robot;
a program generator; and
a customizer configured to perform operations for each of the plurality of template elemental motion programs stored in the storage unit sequentially, the operations including displaying a parameter specifying screen by using the GUI, the parameter specifying screen being a screen for specifying all of the one or more parameters of a particular template elemental motion program, and thereafter causing the storage unit to store the particular template elemental motion program as a custom elemental motion program when the one or more parameters of the particular template elemental motion program are specified by a user by using the parameter specifying screen, wherein:
the program generator is configured to generate the whole motion program based on a plurality of the custom elemental motion programs stored in the storage unit, the whole motion program containing the plurality of the custom elemental motion programs, and
the plurality of template elemental motion programs include a template elemental motion program that contains, at least, for a corresponding piece of elemental work, one or more sets of hand end position coordinates as the one or more parameters, the one or more sets of hand end position coordinates defining a necessary movement of the dual-arm robot for the corresponding piece of elemental work, the template elemental motion program being configured such that the necessary movement of the dual-arm robot is specified when all of the one or more sets of hand end position coordinates are specified.

* * * * *